Aug. 19, 1947.  A. G. FORSYTH  2,426,008
POWER UNIT FOR AIRCRAFT AND THE LIKE
Filed July 13, 1944  5 Sheets-Sheet 1
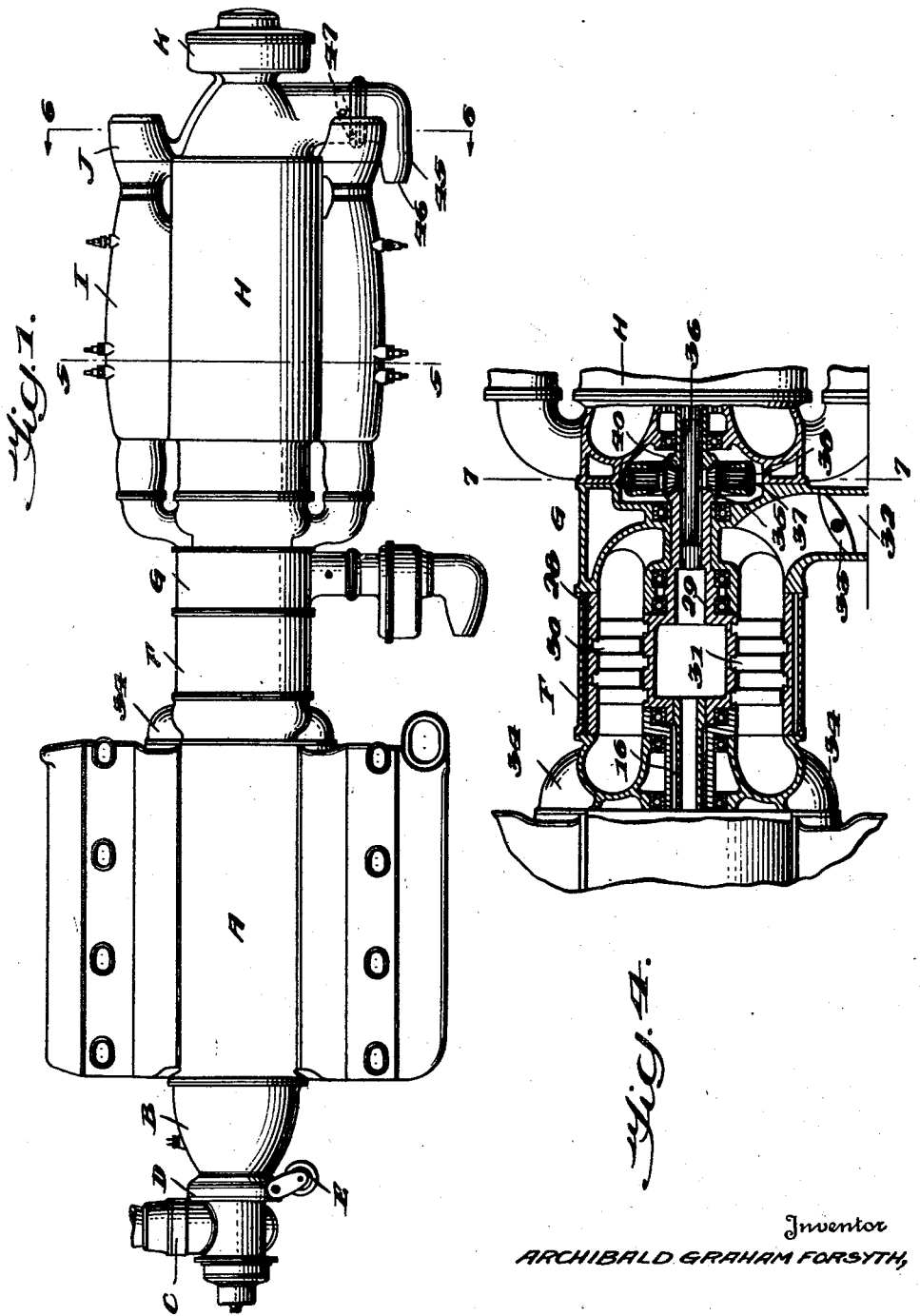
Inventor
ARCHIBALD GRAHAM FORSYTH,
By Robert B. Larson
Attorney

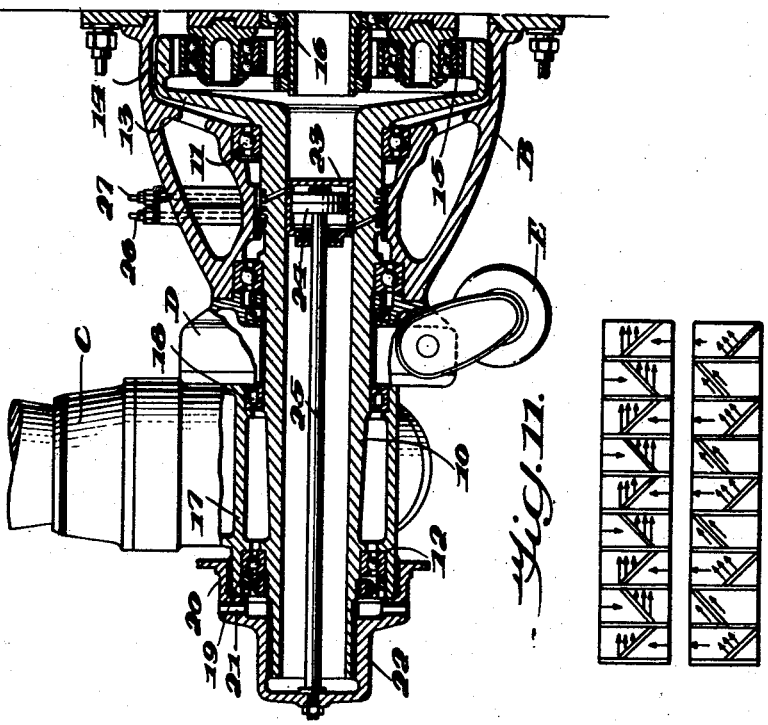

Aug. 19, 1947.  A. G. FORSYTH  2,426,008
POWER UNIT FOR AIRCRAFT AND THE LIKE
Filed July 13, 1944  5 Sheets-Sheet 3

Inventor
ARCHIBALD GRAHAM FORSYTH,

By Robert B Larson
Attorney

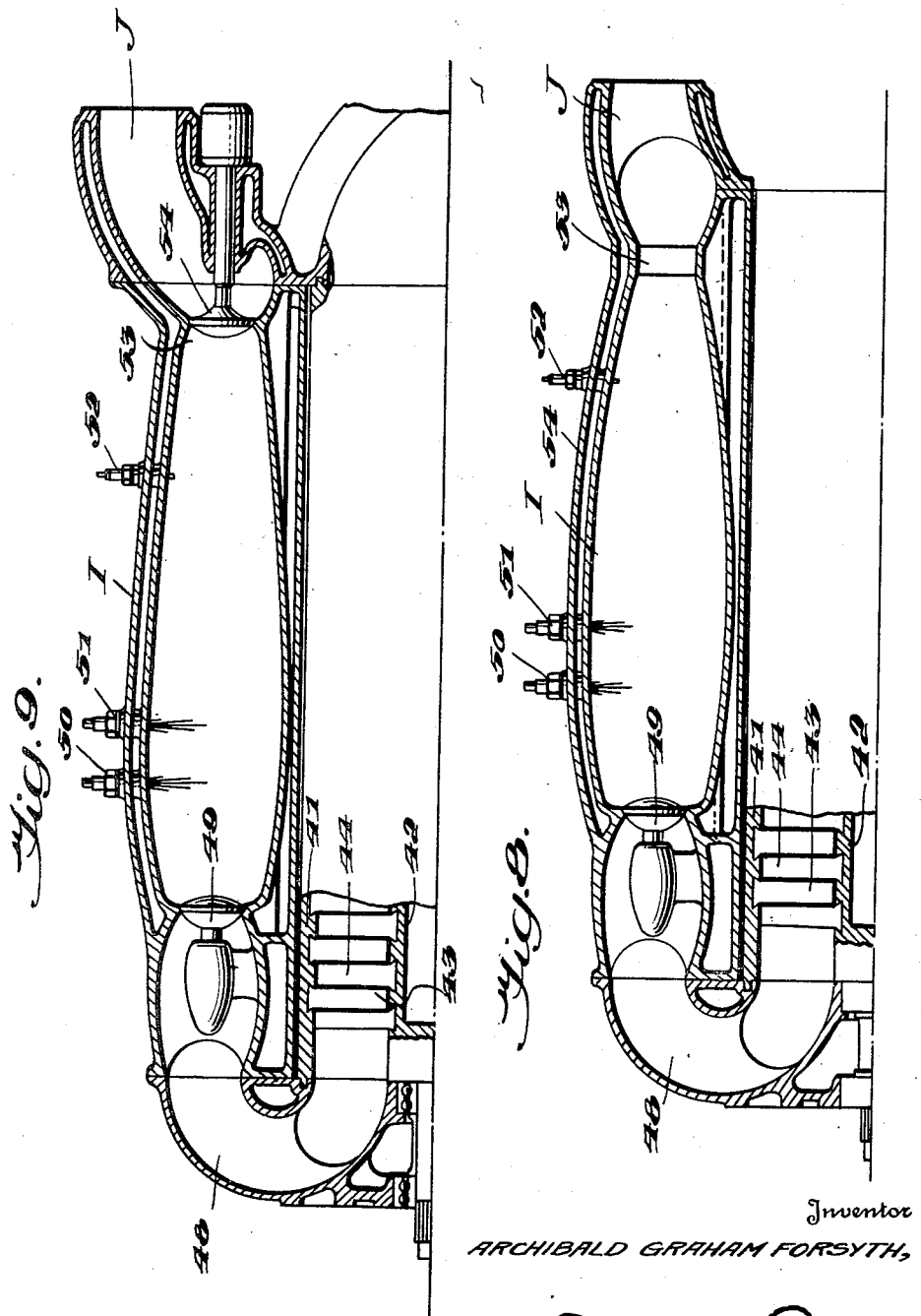

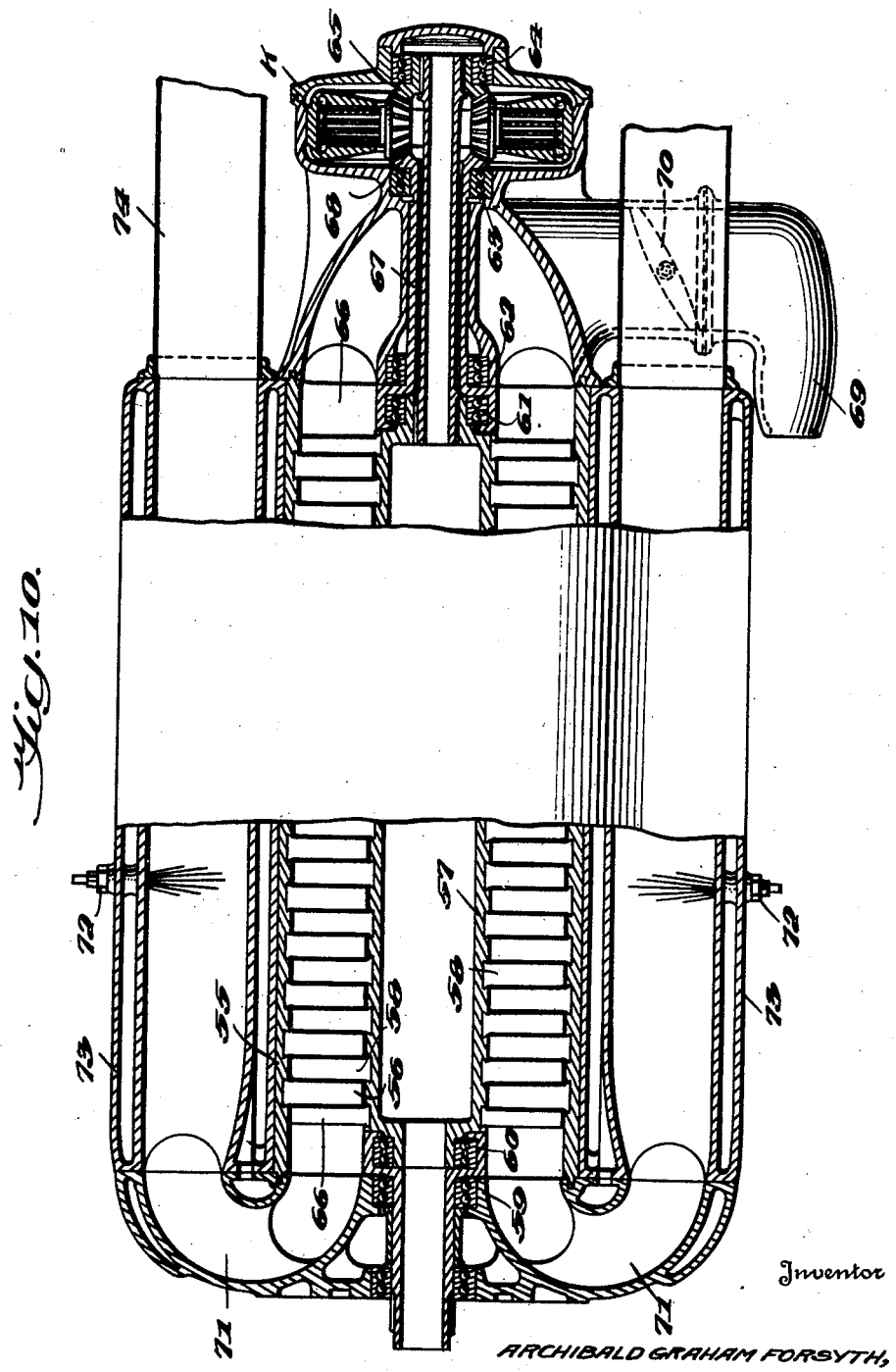

Patented Aug. 19, 1947

2,426,008

UNITED STATES PATENT OFFICE 2,426,008

POWER UNIT FOR AIRCRAFT AND THE LIKE

Archibald Graham Forsyth, Cheam, England, assignor to The Fairey Aviation Company Limited, Hayes, England Application July 13, 1944, Serial No. 544,789

7 Claims. (Cl. 170—135.6)

This invention relates to a power unit for aircraft and the like. More particularly it relates to a power unit having a supercharged internal combustion engine clutched to drive a variable pitch propeller, and also to drive a compressor which is surrounded with combustion chambers for supplying the products of combustion to propulsion jets. The arrangement is such that the axis of rotation of the propellers, the axis of the motor, its supercharger, and the axis of the compressor are in alignment. It is a general object of the invention to provide such a unit.

Another object of the invention resides in providing such a unit in which the aircraft may be driven by the propellers alone, or by the propellers and also by jet propulsion, or by jet propulsion alone, in which latter instance the propellers may be declutched and fully feathered.

These and other objects of the invention will become more apparent from the following description and claims when read on the accompanying drawings in which:

Fig. 1 is a side elevation of one form of the invention;

Fig. 2 is a front elevation of the same;

Fig. 3 is a vertical longitudinal section taken through the front end of the same form;

Fig. 4 is a vertical longitudinal section taken through the central part of the invention and showing the engine supercharger and the clutching arrangement;

Fig. 8 is a longitudinal section through the compressor and showing one of the surrounding combustion chambers;

Fig. 9 is a view similar to Fig. 8, but showing a modified form of combustion chamber;

Fig. 10 is a vertical longitudinal section through a modified form of compressor; and Fig. 11 is a diagrammatic representation of the compressor blade action.

Figure 5:
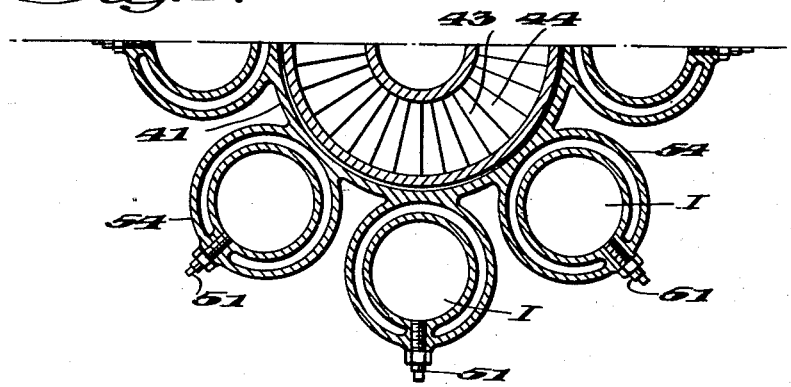
Fig. 5 is a section taken on the line 5—5 of Fig. 1.

Fig. 1 shows the general arrangement of the various mechanisms which comprise the unit. In this figure, A indicates an internal combustion engine of the H type. Mounted forwardly of the engine and secured thereto is a housing B containing gearing and clutch means by which the propeller C may be clutched or declutched from the engine.

The propeller C is of the variable pitch type, and the arrangement includes pitch changing mechanism D adapted to be actuated by an electric motor E or the like.

The shaft of the engine A, at the rear, drives a supercharger F and the engine shaft may also be clutched or declutched by a clutching device G to a compressor H (see Fig. 4 also). The compressor is adapted to supply air under pressure to a plurality of combustion chambers I which surround the compressor H. The combustion chambers I discharge their exhaust gases through propulsion jets J against the atmosphere to effect a propulsive force.

The compressor H may be of the type in which one set of blades is rotatable and the other set stationary, or selectively, both sets may be rotatable and in opposite directions. To effect this selective action of the compressor blades, a clutch device K is provided.

With specific reference to Figs. 1, 2 and 3, the housing B secured to the front facing of the engine A, encloses a hollow shaft 10 mounted in bearings 11 and 12 for rotation about its longitudinal axis. The engine end of the shaft 10 is flanged as at 13 and the flange is formed with a ring gear 14 having teeth on its inner periphery. This ring gear is engaged by planetary pinions 15 which also engage teeth on the end of the engine drive shaft 16 (see Fig. 3). Rotation of the engine drive shaft 16 will, through pinions 15 and ring gear 14, thus drive the hollow shaft 10.

The propeller hub 17 is mounted by bearings 18 and 19 for rotation about the hollow shaft 10. The forward face of the propeller hub 17 is provided with a ring gear 20 adapted to be engaged by teeth 21 on a cap member 22 splined on the forward end of the hollow shaft 10. The teeth on the cap 22 and on the ring gear 20 may be caused to engage or disengage by means of a hydraulic clutch arrangement.

The hydraulic arrangement is comprised of a cylinder 23 disposed within the hollow shaft 10. The cylinder 23 encloses a piston 24 having a shaft 25 which extends forwardly within the hollow shaft 10 and is secured at its forward end to the cap 22. The piston 24 is adapted to be moved within the cylinder 23 by fluid under pressure supplied through conduits 26 and 27 leading to a source of supply (not shown).

It will be apparent that movement of the piston 24 in one direction will declutch the cap 22 from the hub ring gear 20, and that movement of the piston in the other direction will cause these two parts to be clutched. When clutched the propeller hub 17 will thus rotate with the hollow shaft 10 driven by the engine.

The propeller C is of the variable pitch type. The pitch changing mechanism per se forms no part of this invention and is here merely indicated by the reference letter D as driven by a small electric motor E. The pitch changing mechanism should be capable however at least of fine, coarse and feathering positions and preferably also of being adjusted for braking or reverse position.

The engine A, as previously indicated, is provided with a supercharger F. Directing attention now to Figs. 1 and 4, it will be noted that the supercharger F is comprised of a jacketed casting 28 and central rotor 29 adapted to be rotated from the engine shaft 16. The casing 28 is provided on its inner surface with a plurality of spaced radial compressor blades 30 rigidly secured to said casing. The rotor 29 is provided with a series of radial blades 31 secured thereto. The blades 30 and 31 are disposed in the space between the casing 28 and the rotor 29 in alternating relationship.

The supercharger is adapted to be fed with air which enters the inlet 32 controlled by a butterfly valve 33 or the like, and then passes to the space between the casing and rotor. It is compressed by the blades 30 and 31 and is then delivered through the conduits 34 to the intake manifold of the engine A.

Figure 7:
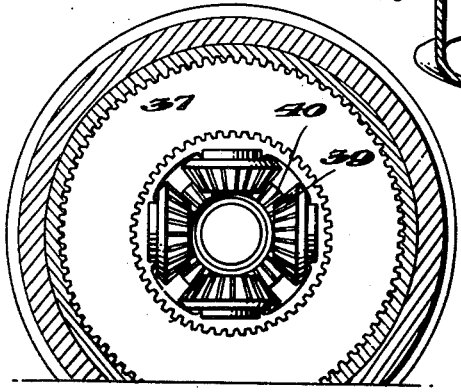
Fig. 7 is an enlarged section taken on the line 7—7 of Fig. 1 through the clutching device.

The shaft of the rotor 29 is adapted, through a clutching device G to drive a compressor H. With reference to Fig. 4, this shaft at its rear end, is formed with a bevel gear 35 forming one side of the clutch device G, the other side of the clutch device being connected to drive the shaft 36 of the compressor H. The clutch device G is of known type but for purposes of identification a section therethrough is shown in Fig. 7. It is comprised of two sets of annular discs 37 and 38 which may be caused to engage each other frictionally by any suitable means not shown. Also included in the clutch device are a number of bevel gears 39 which mesh with bevel gear 35 and also with the bevel gear 40 on the shaft 36. The device is such that, when the discs frictionally engage, the bevel gears 39 may not rotate about the axis of the shaft 36 and consequently the rotor 29 will drive shaft 36. When the discs 37 and 38 are not engaging, bevel gears 39 are free to rotate about the axis of shaft 36 and rotation of rotor 29 will not drive shaft 36 of the compressor.

The compressor H is comprised of a cylindrical tubular member 41 and a central rotor shaft 42 coaxially disposed with respect to each other. The member 41 is spaced outwardly from the rotor shaft 42 and the space therebetween is a compression space. Compressor blades 43 secured to the inner wall of the member 41 project radially inwards and are evenly spaced along the member. The rotor shaft 42 has a series of spaced blades 44 secured to rotate therewith. These blades 44 project radially outwards and occupy the spaces between the blades 43, as shown in Fig. 8.

Air is adapted to enter the compressor space from the rear through an inlet pipe 45 having an opening 46 facing forwardly in the direction of flight (Fig. 1). The inlet pipe 45 is valve controlled by a butterfly valve 47 or the like (see Fig. 6).

Air compressed by the compressor blades 43 and 44 in its passage through the compressor is directed by the curved passages 48 (Fig. 8) to the combustion chambers I.

The combustion chambers I are of special design, as shown in Fig. 8. Their principal portion has a cigar-shaped interior and the entrance to each is controlled by an inlet valve 49.

A pair of jets 50 and 51 are adapted to inject a fuel which mixes in the combustion chamber. A sparking plug 52 is employed for causing the explosion, especially when the device is first operated and before it becomes hot.

The combustion chambers I each terminate rearwardly in a propulsion jet J and the passage connecting the two is formed as a venturi 53.

It will be noted from Fig. 8 that the combustion chambers I and their joined propulsion jets J are provided with cooling jackets 54 for a cooling fluid.

The manner of operating the inlet valves 49 for the combustion chambers I forms no part of this invention. Any suitable system may be employed such as that shown in my copending application, Serial No. 437,429, filed April 2, 1944.

Figure 6:
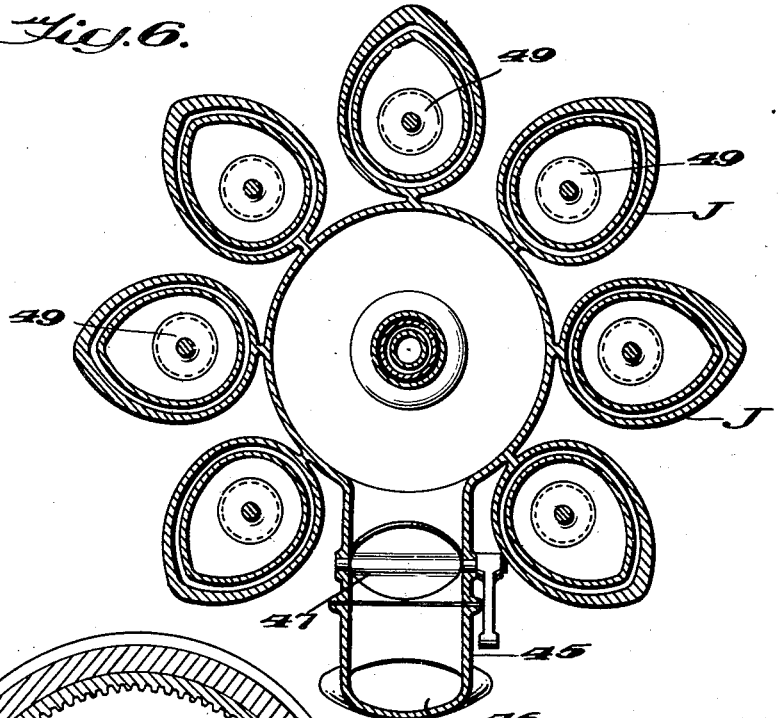
Fig. 6 is a section taken on the line 6—6 of Fig. 1.

Figs. 5 and 6 are vertical sections through the compressor and surrounding combustion chambers and serve to show more clearly the disposition of these elements.

The operation of the arrangement should now be fairly clear. Operation of the internal combustion engine H may (through the clutching arrangement in housing B) drive the propellers C. The engine is supercharged by supercharger F and the engine H through clutching device G may drive the compressor H, thus furnishing the combustion chambers I with compressed air for mixing with fuel. The products of combustion are ejected through the Venturi connection 53 of the propulsion jets J and thence to the atmosphere where they exert their propulsive effect.

With the two clutching devices, the one for the propellers C and the other for the compressor H, it will be noted that several operative combinations are possible. The engine H may drive both the propellers and the compressor so that the craft will be propelled both by the propellers C and by jet propulsion. Or, the engine may drive the propellers alone, the compressor H being declutched. Or the propellers may be declutched (and feathered by the variable pitch mechanism D) and the craft propelled by jet propulsion alone with the engine driving the compressor only.

A further modification in operation is also possible. It has been mentioned that the compressor H is provided at its rear end with another clutch device K (see Fig. 1). As will be described more clearly in connection with another embodiment, this clutch K makes it possible to drive the compressor rotor blades 44 alone, the blades 43 secured to the member remaining stationary with the casing 41. Alternatively, the member 41 may also be driven, and in an opposite direction, thus effecting two steps of compression.

A modified form of combustion chamber I is illustrated in Fig. 9. This differs from that shown in Fig. 8 only in that the Venturi passage 53 between the chamber I and the propulsion jet J is controlled by an outlet valve 54. Here again the means for actuating this valve 54 form no part of the invention, but reference may be had to my copending application, Serial No. 437,429, filed April 2, 1942.

Finally, in Fig. 10 there is illustrated an alternative form of compressor and combustion chamber arrangement. The compressor portion illustrated is the same as that employed in the embodiment of Figs. 1 to 8, inclusive, and, since the showing in Fig. 10 is more complete, a brief description thereof will be given.

The tubular outer member 55 is provided with the inwardly directed radial compressor blades 56 rigidly secured to the tubular member.

The rotor shaft 57, driven from the engine, has outwardly projecting radial blades 58 secured to rotate with the shaft 57. Each set of blades 56 and 58 is evenly spaced so that the blades 56 and 58 are disposed in alternate relationship to each other in the space between the tubular member 55 and the rotor shaft 57. This space forms the compression space.

Both the rotor shaft 57 and the tubular member 55 are mounted for rotation with respect to each other about their common longitudinal axis. For this purpose the bearings 59, 60, 61, 62, 63 and 64 are provided.

The rotor shaft 57 extends rearwardly of the compressor to the rear side of the clutch device K where it is splined to the clutch bevel gear 65. The tubular member 55 is joined by spiders 66 to the sleeve 67 which extends rearwardly to the forward end of the clutch device K, the rear end of the sleeve being formed as a clutch bevel gear 68.

The clutch device K is of known type similar to the clutch device G already described. In the present connection its operation is such that, when it is declutched, the engine will drive only the rotor shaft 57, the tubular member 55 and its blades 56 then remaining stationary. This provides a first compression step. It is diagrammatically illustrated in the upper portion of Fig. 11.

When, however, the clutch device K is clutched, the engine will drive rotor shaft 57 and, through clutch device K, the tubular member 55 and its blades 56 will be rotated in the opposite direction. This provides a second compression step. This is diagrammatically illustrated in the lower portion of Fig. 11.

As in the embodiment of Figs. 1 to 8, inclusive, air enters the compressor H from the rear through an inlet pipe 69 controlled by a valve 70. The compressed air leaves the compressor at the forward end and is directed by the curved passageways 71 to the combustion chambers I.

The combustion chambers I in Fig. 10 are generally similar to those already described, but their rear ends are not constricted. They are provided with fuel injecting nozzles 72 and may have cooling jackets 73. The combustion chambers are connected to any suitable type of rearwardly projecting propulsion jets (not shown). The jets may be similar to those illustrated in some of the other figures.

The engine A may be of the H type (as shown) with a 10-1 compression ratio and with fuel injection supercharged to, say, 40,000 feet. It will be noted that the engine is directly coupled to the uniflow supercharger F and also (through clutch device G) to the uniflow compressor. It will be noted that the throttles are fitted to the intakes of the supercharger and compressor. It is intended that the throttle for the supercharger will be controlled by the boost control, and that the compressor throttle can be fully closed thereby allowing the rotor of the compressor to be driven by the engines as fractional power. If desired, the clutch G between engine and compressor could consequently be dispensed with.

The operation of different mechanisms of the unit during different flight conditions should perhaps be mentioned by way of example.

During take-off the propeller is in operation and the engine at take-off boost, with or without having the jets in operation.

During climb both the propeller and jets may be in operation.

During level flight, at low altitude, the propeller only need be in operation. At higher altitude, either the jets alone may furnish the propulsive power, or both the jets and the propeller may be in operation.

Normal cruising would be carried out on propeller only, thus making full use of the low compression engine.

The embodiments illustrated and described are examples only and it should be clear that changes may be made in the structure without departing from the invention which is only to be limited as indicated in the claims which follow.

I claim:

1. A power unit for aircraft and the like comprising, an internal combustion engine, a variable pitch propeller, a supercharger for said engine, a compressor, a series of combustion chambers surrounding said compressor and connected to be supplied by said compresor, each of said combustion chambers terminating rearwardly in a propulsion jet, means for clutching said propeller to be driven by said engine, and drive means connecting said engine to the drive shafts of said supercharger and said compressor.

2. A power unit for aircraft and the like comprising, an internal combustion engine, a variable pitch propeller, a supercharger for said engine, a compressor, a series of combustion chambers surrounding said compressor and connected to be supplied by said compressor, each of said combustion chambers terminating rearwardly in a propulsion jet, means for clutching said propeller to be driven by said engine, and drive means connecting said engine to the drive shafts of said supercharger and said compressor, said propeller, engine, supercharger and compressor being in alignment and being connected in the order named.

3. A power unit for aircraft and the like comprising, an internal combustion engine, a variable pitch propeller, a supercharger for said engine, a compressor, a series of combustion chambers surrounding said compressor and connected to be supplied by said compressor, each of said combustion chambers terminating rearwardly in a propulsion jet, means for clutching said propeller to be driven by said engine, and drive means connecting said engine to the drive shafts of said supercharger and said compressor, said internal combustion engine being a low compression engine, said propeller, engine, supercharger and compressor being in alignment and being connected in the order named.

4. A power unit for aircraft and the like comprising, an internal combustion engine, a variable pitch propeller, a supercharger for said engine, a compressor, a series of combustion chambers surrounding said compressor and connected to be supplied by said compressor, each of said combustion chambers terminating rearwardly in a propulsion jet, means for clutching said propeller to be driven by said engine, and drive means connecting said engine to the drive shafts of said supercharger and said compressor, said internal combustion engine being a low compression engine, said propeller, engine, supercharger and compressor being in alignment and being connected in the order named, said supercharger being driven directly by said internal combustion engine.

5. A propulsion unit for aircraft and the like comprising, an internal combustion engine, a gear and clutch housing secured to the front facing of said engine, a variable pitch propeller carried by said housing, clutch means in said housing for selectively clutching the propeller to be driven by said engine, a housing secured to the rear facing of said engine, a multistage engine supercharger mounted within said housing and connected to be driven by said engine, a housing secured to the rear end of said supercharger housing, a multistage compressor mounted within said last named housing, clutch means between said supercharger and compressor for selectively clutching the compressor shaft to the shaft of the supercharger, a plurality of elongated combustion chambers surrounding said compressor and terminating rearwardly in propulsion jets, and passage means connecting said compressor and said combustion chambers to enable the latter to be supplied with gases under pressure from said compressor.

6. In a propulsion unit for aircraft and the like comprising, an internal combustion engine, a gear and clutch housing secured to the front facing of said engine, a variable pitch propeller carried by said housing, clutch means in said housing for selectively clutching the propeller to be driven by said engine, a multistage engine supercharger mounted within said housing and connected to be driven by said engine, a housing secured to the rea rend of said supercharger housing, a multistage compressor mounted within said last named housing, clutch means between said supercharger and compressor for selectively clutching the compressor shaft to the shaft of the super-charger, that improvement which comprises the provision of a plurality of elongated combustion chambers surrounding said compressor and terminating rearwardly in propulsion jets, and passage means connecting said compressor and said combustion chambers to enable the latter to be supplied with gases under pressure from said compressor, said compressor having two sets of blades and means for rotating said sets of blades in opposite directions, a housing secured to the rear end of said compressor, and a clutch in said rear housing for said blade rotating means, whereby one of said sets of blades may selectively be caused to remain stationary.

7. In a propulsion unit for aircraft and the like comprising, an internal combustion engine, a gear and clutch housing secured to the front facing of said engine, a variable pitch propeller carried by said housing, clutch means in said housing for selectively clutching the propeller to be driven by said engine, a multistage engine supercharger mounted within said housing and connected to be driven by said engine, a housing secured to the rear end of said supercharger housing, a multistage compressor mounted within said last named housing, clutch means between said supercharger and compressor for selectively clutching the compressor shaft to the shaft of the super-charger, that improvement comprising the provision of a plurality of elongated combustion chambers surrounding said compressor and terminating rearwardly in propulsion jets, and passage means connecting said compressor and said combustion chambers to enable the latter to be supplied with gases under pressure from said compressor, said compressor having two sets of blades and means for rotating said sets of blades in opposite directions, a housing secured to the rear end of said compressor, and a clutch in said rear housing for said blade rotating means, whereby one of said sets of blades may selectively be caused to remain stationary, said propeller, clutch housing, engine, supercharger, compressor and rear clutch housing all being mounted in tandem in the order named.

ARCHIBALD GRAHAM FORSYTH.

REFERENCES CITED

The following references are of record in the file of this patent:

UNITED STATES PATENTS

| Number | Name | Date |
|---|---|---|
| 1,346,993 | Thompson | July 20, 1920 |
| 2,156,750 | Caldwell | May 2, 1939 |
| 2,356,557 | Anxionnaz et al. | Aug. 22, 1944 |
| 2,024,274 | Campini | Dec. 17, 1935 |

FOREIGN PATENTS

| Number | Country | Date |
|---|---|---|
| 411,473 | France | June 17, 1910 |
| 495,469 | Great Britain | Feb. 8, 1937 |

OTHER REFERENCES

"Possibilities of Jet Propulsion," by G. Geoffrey Smith, published in Flight, August 28, 1941, pages 116 and 117. (Copy in Scientific Library.)

Richard (A. P. C.), Serial No. 396,458, May 25, 1943.